May 16, 1967      W. E. REEFMAN      3,319,472

COMBINATION TIME BASE ACCELEROMETER

Filed May 6, 1964

*INVENTOR.*
WILLIAM E. REEFMAN

BY *Arthur M. Sloan*

United States Patent Office 3,319,472
Patented May 16, 1967

3,319,472
COMBINATION TIME BASE ACCELEROMETER
William E. Reefman, Santa Barbara, Calif., assignor to Varo, Inc., Garland, Tex.
Filed May 6, 1964, Ser. No. 365,411
4 Claims. (Cl. 73—517)

My invention relates to an accelerometer which provides both time and acceleration information. Thus, from my accelerometer all necessary and required data may be obtained for determining velocity.

The present invention employs a differential transformer in combination with a standard tuning fork assembly. The tuning fork and its associated circuit provide a time base as well as a signal source for the differential transformer.

The accelerometer of this invention supplies acceleration information and could be made to supply time information which when combined with the acceleration information in an appropriate computer device would give velocity. Since the accelerometer of this invention utilizes a tuning fork, and tuning forks are timing sources, time information is provided by and may be derived from the accelerometer. Such time information may be derived by using an appropriate counter or a reading may be taken over one cycle or a stated number of cycles. Thus the accelerometer of this invention provides velocity information or some of the ingredients of velocity from which velocity may be determined.

The accelerometer of this invention provides more accurate velocity information than devices heretofore used since frequency errors due to fork tine stiffness are compensated automatically in the acceleration output sensitivity. Further, this invention eliminates threshold effects at extremely low levels of acceleration by providing a dynamic condition of operation for the acceleration sensing device due to vibration of the tines in their normal mode of operation.

The device of my invention is economical to produce since the tuning fork tines serve three functions, viz., as a time base, as an acceleration sensing element, and as an energy source for the acceleration device.

Normally, all of the information derived from the one device of my invention is obtained from two or more separate instruments, the acceleration information being derived from any of a number of calibrated spring devices, rate gyroscopes or force balance devices.

Accordingly, it is an object of my invention to provide accurate acceleration information which may be utilized in determining velocity.

Another object of my invention is to eliminate threshold effects at extremely low levels of acceleration.

Still another object of my invention is to produce one device which combines the functions of time base and accelerometer.

A further object of my invention is to provide an econominal time base accelerometer.

Other objects and advantages of this invention will become apparent to those skilled in the art upon reference to the accompanying specification, claims and drawings, in which:

Figure 1:
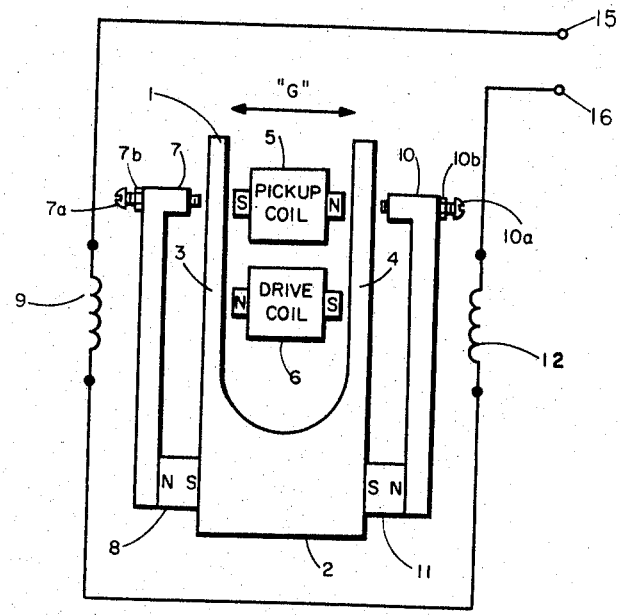
FIGURE 1 is a diagrammatic or a schematic representation of the invention.

The system of this invention includes a tuning fork assembly 1 of the standard type. This tuning fork assembly comprises tuning fork 2 having tines 3 and 4, pick-up coil 5 and drive coil 6. Associated with tuning fork assembly 1 as supplementary voltage pick-up devices are two arrangements; one consisting of pole piece 7 with adjustment screw 7a and locknut 7b, magnet 8, and coil 9, and the other consisting of pole piece 10 with adjustment screw 10a and locknut 10b, magnet 11, and coil 12. These separate pick-ups are positioned to produce equal voltages from the movement of the tines.

The supplementary pick-up coils 9 and 12 are connected in series opposition, such that the voltages in coils 9 and 12 cancel each other out and produce essentially zero output volts under a condition of no acceleration of the tuning fork assembly.

When the device of this invention is accelerated in a plane normal to the outside surface of the fork tines 3 and 4, the tines will deflect and continue to vibrate about new centers, one tine being closer to its pick-up pole piece and the other being further from its pick-up pole piece. This changes the balance of the cancelling voltages and produces a differential output voltage between coils 9 and 12 that is proportional to acceleration and with a 180° phase difference between positive and negative accelerations.

The tines 3 and 4 are driven in their normal mode of operation by the drive coil 6 and the pick-up coil 5 in conjunction with an associated transistor circuit of the type well known in the art.

Figure 2:
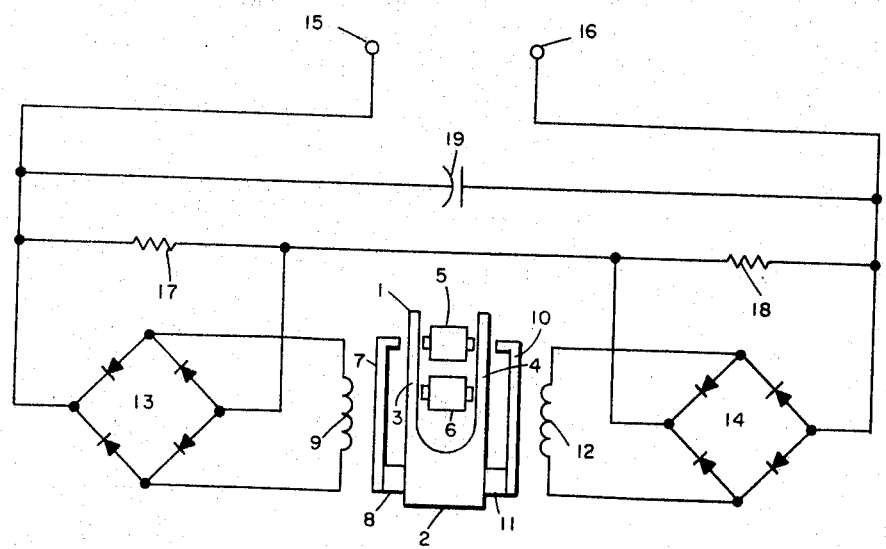
FIGURE 2 is a schematic diagram which shows a discriminator circuit which may be used to distinguish between positive and negative "G" forces.

A discriminator as illustrated in FIG. 2 may be used to distinguish between positive and negative "G" forces. Frequency of the tuning fork 2 increases with acceleration in either direction (as indicated by the arrows in FIG. 1) at the rate of .0002%/G. This increase in frequency is normally insignificant since it is smaller than the standard accuracy of the tuning fork.

The discriminator circuit shown in FIG. 2 provides a D.C. output whose polarity is dependent on the direction of acceleration forces with the polarity reversing at zero G.

The discriminator of FIG. 2 operates as described hereafter:

Coils 9 and 12 each supply an alternating current to respective bridge rectifiers 13 and 14. The voltages applied to the bridge rectifiers are essentially equal, the frequency being that of the tuning fork.

The direct current output voltages of the two bridge rectifiers, 13 and 14, are connected in series opposition, such that the net output voltage appearing at terminals 15 and 16 is essentially zero volts under the condition of zero acceleration.

As the instrument experiences acceleration in its sensitive plane, one of the D.C. voltages will increase, while the other voltage will decrease, thus causing a voltage to appear at terminals 15 and 16.

Since the D.C. outputs of the bridge rectifiers 13 and 14 are connected in series opposition, the polarity of the voltage at terminals 15 and 16 will reverse at zero acceleration, providing one polarity for positive acceleration and the opposite polarity for negative acceleration, or deceleration.

Numerous methods which are common to the art may be employed to obtain the desired degree of balance of the individual voltages. The resistors 17 and 18 may be comprised of a single potentiometer whose tap is the common connection to the two bridge rectifiers. Capacitor 19 serves the normal function of a filter.

A preferable method of obtaining balance would employ adjustment screws 7a and 10a to adjust pole pieces 7 and 10. These screws would allow the air gaps to be varied to such a degree that a balance of voltages would occur.

Positive and negative G forces may also be distinguished utilizing the output of the instrument directly where the related equipment is phase sensitive. In this case the signal output voltage experiences a 180° phase shift as the G forces pass through zero acceleration.

The infinite resolution obtained by the subject invention is a product not only of the fact that the instrument does not embody any step functions, but it is also due to the fact that the continuous motion of the tines tends to eliminate any threshold effects of the moving system, as related to the accelerometer function. The threshold effects referred to are analogous to what is called 'stiction" in instrument servo systems and is a common problem in any instrument having bearings.

I have determined through tests that acceleration forces have extremely small effects on the frequency of the tuning fork 2, thus providing exceedingly low "crosstalk" between the two channels of information.

The stability of the sensitivity of the accelerometer function is dependent upon the stability of the amplitude of tine displacement. With zero acceleration forces, the output will be zero regardless of tine amplitude; however, the slope of voltage vs. acceleration is directly proportional to tine displacement. To obtain a stable sensitivity for the acceleration output voltage, the fork assembly 1 must incorporate a self-regulating circuit to maintain the oscillator pick-up coil voltage at a constant level. Self-regulating circuits which can be utilized for maintaining the oscillator pick-up coil voltage at a constant level are well known in the art.

The response time of the subject invention is directly related to the tuning fork frequency, the time constant of the tine being the determining factor. Response time will be slower than the time constant of the tine in the case where direct current output is obtained, in that the time constant of the filter will then become the determining factor. In general though, the higher the frequency of the fork, the faster the response.

It is understood that the specific arrangement described represents only one embodiment of the invention and may be variously modified without departing from the spirit of the invention, as defined in the appended claims.

What I claim as my invention is:

1. A time base accelerometer as described comprising a tuning fork assembly including a tuning fork, a drive coil, and a pick-up coil, and supplementary voltage pick-up devices located adjacent each tine of the fork for sensing deflections of the tines in a plane containing the longitudinal axes of the tines for producing a differential output voltage that is proportional to the acceleration of the tuning fork assembly along a line normal to the outside surface of the tuning fork tines in which each supplementary voltage pick-up device includes a pole piece juxtaposed one tine of the tuning fork, a pick-up coil juxtaposed one of said pole pieces, and a magnet interposed between the base of the tuning fork and the base of the adjacent pole piece and wherein the supplementary voltage pick-up devices are positioned to produce equal voltages from the movement of the tines in the absence of an acceleration.

2. A time base accelerometer as described in claim 1 in which the supplementary pick-up coils are connected in series opposition such that the voltages in said pick-up coils cancel each other out and produce essentially zero output volts under a condition of no acceleration of the tuning fork assembly.

3. A time base accelerometer as described in claim 1 including a discriminator to distinguish between positive and negative G forces.

4. A time base accelerometer as described in claim 3 in which the discriminator provides a D.C. output whose polarity is dependent on the direction of acceleration forces with the polarity reversing at zero G.

References Cited by the Examiner
UNITED STATES PATENTS

| | | | |
|---|---|---|---|
| 2,819,052 | 1/1958 | Dudenhausen | 73—517 X |
| 2,928,668 | 3/1960 | Blasingame | 73—517 |
| 2,940,306 | 6/1960 | Lozier | 73—517 |
| 3,141,100 | 7/1964 | Hart. | |

RICHARD C. QUEISSER, *Primary Examiner.*